US009485312B2

(12) United States Patent
Gniffke et al.

(10) Patent No.: US 9,485,312 B2
(45) Date of Patent: Nov. 1, 2016

(54) DATA NETWORK NOTIFICATION BAR PROCESSING SYSTEM

(71) Applicants: Chad Gniffke, Costa Mesa, CA (US); Robert Wendell Davis, Half Moon Bay, CA (US); Mark Thomas Lingen, Woodinville, WA (US); Ryan Smith, San Clemente, CA (US); Mark James Sutherland, Milpitas, CA (US); Scott Robert Powell, Henderson, NV (US)

(72) Inventors: Chad Gniffke, Costa Mesa, CA (US); Robert Wendell Davis, Half Moon Bay, CA (US); Mark Thomas Lingen, Woodinville, WA (US); Ryan Smith, San Clemente, CA (US); Mark James Sutherland, Milpitas, CA (US); Scott Robert Powell, Henderson, NV (US)

(73) Assignee: KASEYA LIMITED, Dublin (IE)

( * ) Notice: Subject to any disclaimer, the term of this patent is extended or adjusted under 35 U.S.C. 154(b) by 363 days.

(21) Appl. No.: 13/709,739

(22) Filed: Dec. 10, 2012

(65) Prior Publication Data

US 2014/0089406 A1 Mar. 27, 2014

Related U.S. Application Data

(63) Continuation-in-part of application No. 13/628,901, filed on Sep. 27, 2012.

(51) Int. Cl.
*H04L 29/08* (2006.01)
*G06Q 10/06* (2012.01)

(52) U.S. Cl.
CPC ............ *H04L 67/147* (2013.01); *G06Q 10/06* (2013.01)

(58) Field of Classification Search
USPC ........................................................ 715/774
See application file for complete search history.

(56) References Cited

U.S. PATENT DOCUMENTS

| | | | | |
|---|---|---|---|---|
| 8,645,856 B1* | 2/2014 | Burr et al. | .................... | 715/774 |
| 2005/0039135 A1* | 2/2005 | Othmer et al. | ............... | 715/774 |
| 2010/0274366 A1* | 10/2010 | Fata | ........................ | G05B 15/02 700/7 |
| 2011/0239228 A1* | 9/2011 | Grigsby | .................. | G06F 9/542 719/313 |
| 2012/0222002 A1* | 8/2012 | Harrison | ............... | G06F 11/328 717/113 |
| 2013/0054706 A1* | 2/2013 | Graham | ................ | H04M 19/04 709/206 |
| 2014/0089099 A1* | 3/2014 | Money | ....................... | 705/14.66 |

OTHER PUBLICATIONS

Rankins, R.; Bertucci, P.; Gallelli, C.; Silverstein, A., "Microsoft SQL Server 2005 Unleashed" (2007), Sams Publishing, pp. 1-1939 [retrieved from http://techbus.safaribooksonline.com/book/databases/microsoft-sql-server/0672328240].*

(Continued)

*Primary Examiner* — Brian W Wathen

(57) ABSTRACT

A method and apparatus are disclosed of providing a user application with a notification message. One example method may include receiving a script to setup a message queue, the script may include a database schema and the script may be executed by a processor to apply the database schema to a database that includes the message queue. The method may also include receiving one or more notifications messages having specific notification content that is applied to notification messages. The notifications may be received from a remote device. The message queue may include notification content used to generate notification messages destined for end user devices.

20 Claims, 8 Drawing Sheets

(56) References Cited

OTHER PUBLICATIONS

Microsoft, "CREATE QUEUE (Transact-SQL)" (2014), pp. 1-5 [retrieved from http://technet.microsoft.com/en-us/library/ms190495(d=printer,v=sql.90).aspx].*

Microsoft, "Stock Sample" (Jul. 17, 2006), pp. 1-5 [retrieved from http://msdn.microsoft.com/en-US/library/ms160739(d=printer,v=sql.90).aspx].*

Campbell, D., "Service Oriented Database Architecture: App Server-Lite?" (Jul. 14-16, 2005), Proceedings of the 2005 ACM SIGMOD international conference on Management of Data, pp. 857-862 [retrieved from http://dl.acm.org/citation.cfm?id=1066267].*

Perrine, R., "Implementing ITIL with Kaseya Tools" (Feb. 16, 2011), pp. 1-16 [retrieved from http://resourcelibrary.treasuryandrisk.com/content12028].*

* cited by examiner

DATA NETWORK NOTIFICATION BAR PROCESSING SYSTEM

CROSS-REFERENCE TO RELATED APPLICATIONS

This application is a continuation-in-part of patent application Ser. No. 13/628,901, entitled "DATA NETWORK NOTIFICATION BAR USER INTERFACE", filed on Sep. 27, 2012, the entire contents of which are hereby incorporated by reference.

TECHNICAL FIELD OF THE APPLICATION

The present application is generally related to a status bar in a graphical user interface, and more particularly, to a status bar updating and processing system.

BACKGROUND OF THE APPLICATION

Conventionally, status information made available to users of applications operating on a computing device within a data network environment is limited in its accessibility and its current status functions. For example, it is difficult for users to know which areas of a virtual computing environment or virtual systems administrator (VSA) require attention or service updates at all times. Because the functionality of the VSA is comprehensive (i.e., computer agents, mobile agents, tickets, alarms, server updates, updates, etc.) a user could be problem solving in one area or portion of an application interface and not realize that their attention is required in another area of the application.

According to one conventional example of operation, if a user is working as an administrator handling customer work order "tickets" (i.e., known problems), the application interface would generally not offer any indicators that would prompt the user of recent updates, such as mail messages recently received, current server updates, and/or other alarms or notifications that could be detrimental if not expedited immediately. For instance, the user may have navigated to a less common interface page of an application in order to process a customer ticket while failing to notice important incoming mail or recent alerts that may be more important requiring immediate attention. In practicality, users are constantly switching between navigation items, checking messages, tickets, alarms, etc., which may be slow moving and inefficient. Alternatively, the users are simply ignoring items that may be important in the other areas of the application as they continue to work on one area (i.e., customer tickets).

SUMMARY OF THE APPLICATION

One example embodiment of the present application may include a method including receiving a script to setup at least one message queue, the script comprising a database schema, and executing the script via a processor and applying the database schema to a database including the at least one message queue. The method may also include receiving at least one notification content from a remote device, and updating the at least one message queue to include the notification content as a notification message destined for at least one end user device.

Another example embodiment may include an apparatus including a receiver configured to receive a script to setup at least one message queue. The script may include a database schema. The apparatus may also include a processor configured to execute the script and apply the database schema to a database including the at least one message queue. The receiver may also be configured to receive at least one notification content from a remote device, and the processor is also configured to update the at least one message queue to include the notification content as a notification message destined for at least one end user device.

DETAILED DESCRIPTION

Example embodiments provide a notification bar that updates and provides related information that may be used to keep the user informed of data network changes and updates. The present information technology (IT) systems management application may provide notification bar information to a user interface in a simple and efficient manner. For example purposes, a procedure may include a set of automated tasks to be scheduled and executed on a managed device (client) or on a management server, as part of a service desk effort (i.e., ticket workflows). The notifications may be created/edited within a virtual system administrator (VSA) application and stored on a server in a ticket processing queue.

Figure 1:
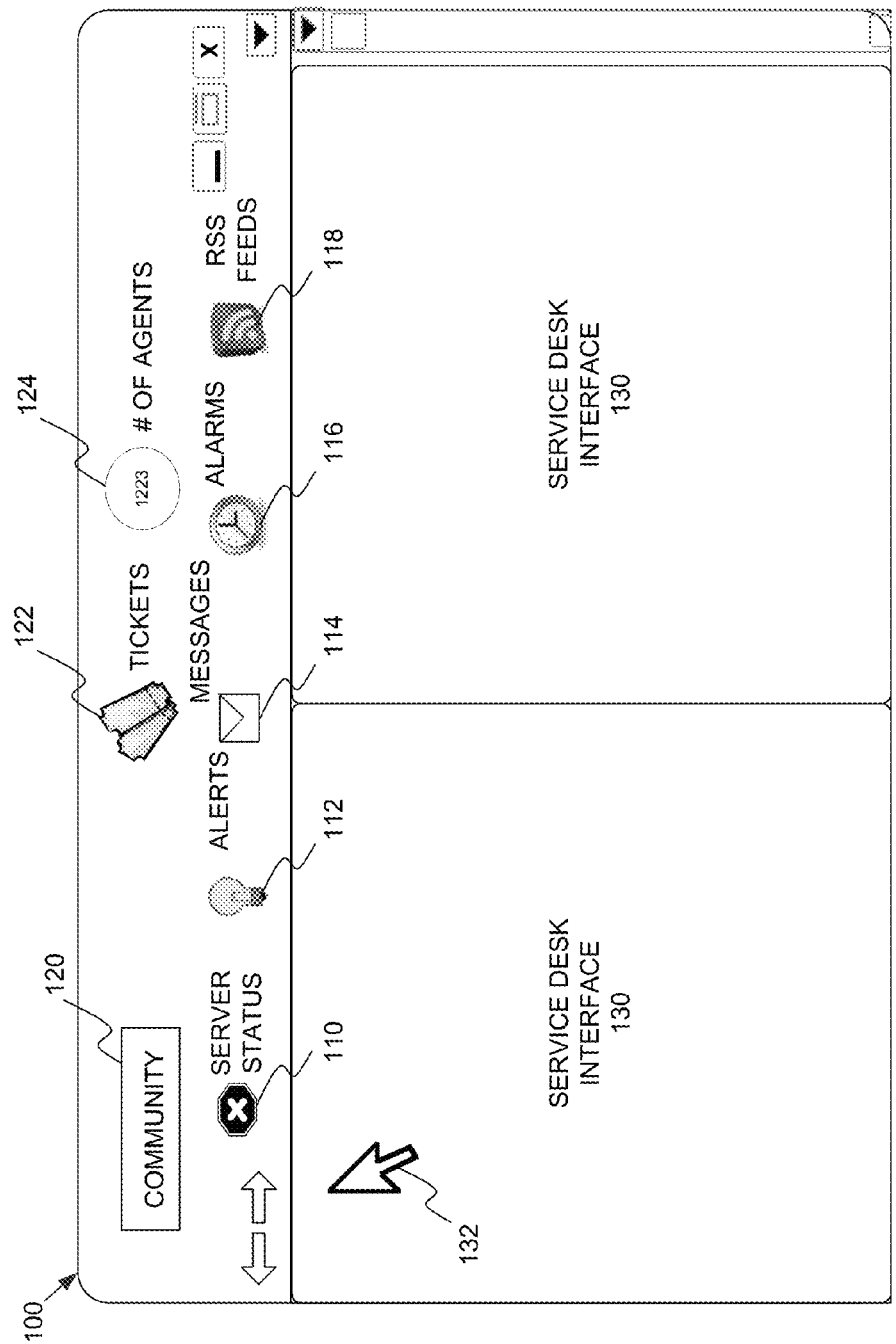
FIG. 1 illustrates an example graphical user interface (GUI) of a notification bar according to example embodiments.

FIG. 1 illustrates an example GUI of a notification bar interface 100 according to example embodiments. Referring to FIG. 1, a notifications bar interface 100 may include various different identifiers and/or icons used to provide dynamic notifications/indications to the user as they become available. The notifications bar provides notifications and access to various administrative items described in detail below. For example, the notifications bar may be populated with a list of items that represent different types of problems, information sources, updates and other useful information needed to help the administrator perform his or her tasks.

The notification bar may have different "categories" of items. For example, the server status 110 may display the status of the server if there is current problem (i.e., server maintenance, server overloaded, server malfunction, server license expired, etc.). An "X" or red stop sign may appear and/or flash when any of the various conditions occurs, or the server may provide a green light indicator when everything is working as expected.

An intelligence message indicator may be represented by a light bulb 112. This type of message will replace the pop-up messages that would normally occur during the login process or other related processes and instead add additional messages which may be listed and accessed when the user performs a hover over operation with the cursor 132. Example messages may include but are not limited to a 'welcome' message for first time users, a server is severely overloaded, a server has reached maximum licenses, a SQL server has tracing enabled, a SQL server and regular server clocks are in sync, heavy logging is enabled in presentation services, too many scripts are scheduled at the same time, auto update in patch management is schedule to run at the same time, server scripts are not being run properly, local host access is not enabled, database size is reaching its size limit, master and subscriber databases have the same collation, ensure exchange server is not operating on the same server as the VSA, the database backup location should have 2× current database size to perform backup, SQL server should use less than 80% of physical memory, performance of audit can be improved with indexes, 'WebExec' function should be running, if any alarms are suspended on any agents, no agent is installed on the machine that you are currently logging in from, "would you like to install now?", an agent has detected a network that hasn't been scanned by the server, "would you like to scan it now?", etc.

The mail icon 114 may represent messages that are presented to the user to display new messages that the user has received through an information center 'inbox'. Certain generated "tickets" 122 may be used to display tickets that the user has selected via filters in the ticket configuration. The tickets may represent information that the user has customized to receive. The user can pick the desk, assignee, status, stage, and category to determine which tickets are important. Whenever a ticket is created or changed to meet the filter criteria, a notification will be sent to the user.

A computer agent status 124 may be used to display the online and offline count of agents to the user so they know the current status of their managed agents (i.e., accounts managed). Alarms 116 may be used to collect all the alarms that the user would want to see and notify them that alarms are maturing on certain agents. This can be configured by setting up a filter on the notification item or by configuring the alarm to provide a notification. The alarm could provide the notification, or the notification item could check all alarms to determine whether it should notify the user.

The RSS reader 118 displays the feed from whatever URL(s) are provided. A default feed will be the server community blog, however any feed (i.e., ESPN, CNN, Slashdot, etc.) can be used. This may be different from other RSS readers that keep track of which items have already been read. This RSS reader 118 displays the current feed, but could be customized to also include previous content feeds. The community icon 120 may provide access to an internal blog or wiki that represents discussions posted by other users or agent devices. The service desk interface 130 represents a portion of desktop used by the user that is uninterrupted by the various notifications of the notification toolbar 100. Regardless of the present workspace being implemented by the user, the notification toolbar 100 may operate alongside and independently of a present workspace.

The various indicators used may incorporate different styles of notification types. For example, there are three types of notifications (e.g., silent, subtle and flyout). The different notification types are similar in some ways to the different kinds of notifications that appear on a smartphone device. For example, you could have an icon be displayed on the top (silent), you could have the phone play a sound and vibrate (subtle), and flyout would be the equivalent of your phone ringing and ringing until the user accessed the phone similar to an alarm clock. The user application that includes the notification bar may be operated on any computing device. The device may be a computer, laptop, mobile, wireless or cellular phone, a PDA, a tablet, a client a server or any device that contains a processor and/or memory, whether that processor or memory performs a function related to an embodiment of the application.

Figure 2:
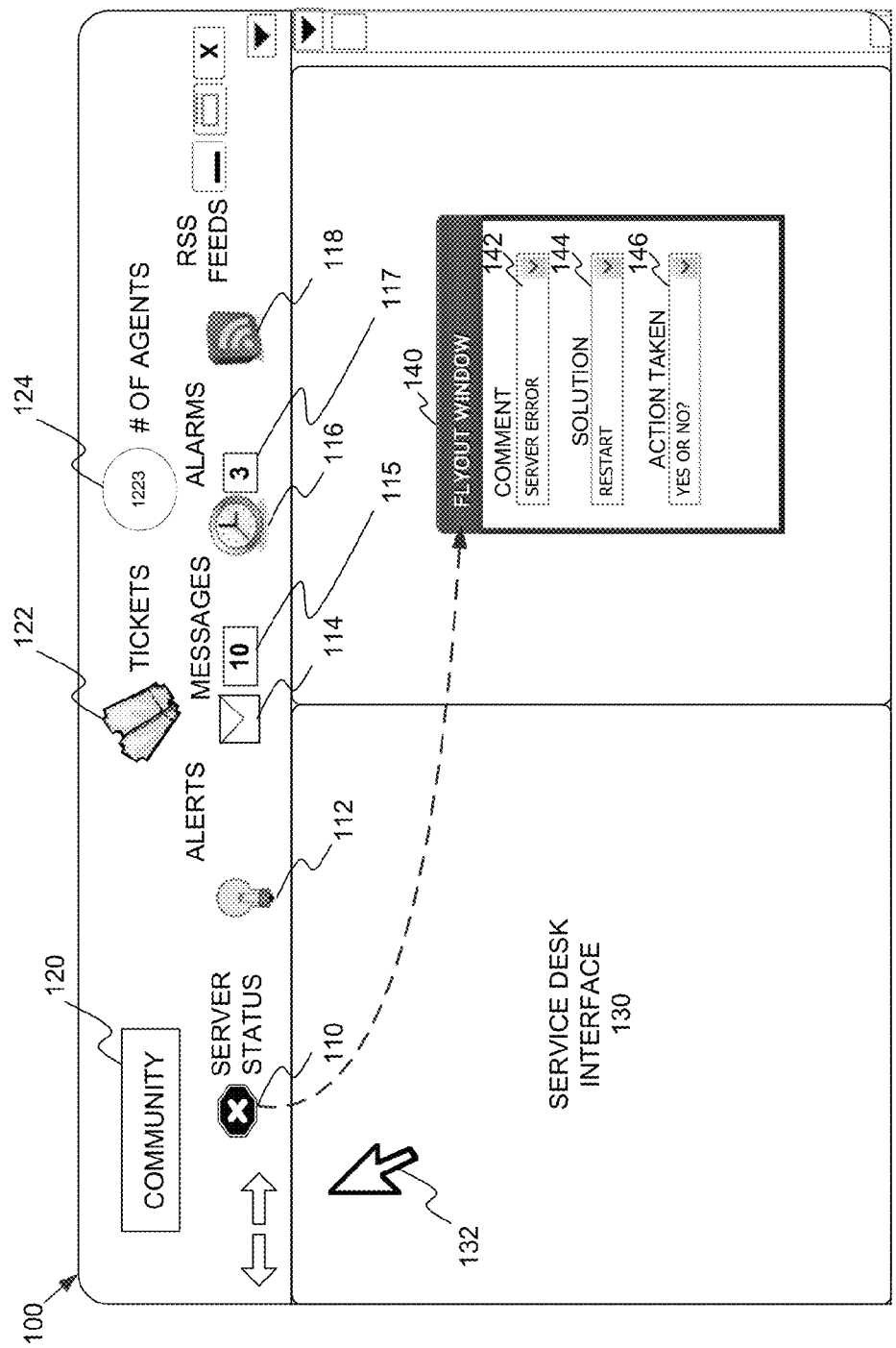
FIG. 2 illustrates an example GUI of a notification bar with a corresponding 'flyout' notification message according to example embodiments.

FIG. 2 illustrates additional details and functions of the notification bar interface. According to a first example notification type, a silent notification may provide a number next to the icon which will change depending on how many notifications are waiting. For example, FIG. 2 provides an indicator for "10" messages 115 next to mail icon or "3" messages 117 next to the alarm icon. Clicking on the item icon 114 or number indicator 115 will expand the notification item and provide a list of the 10 items that can be dismissed individually by clicking on an "X" for the item or dismissed altogether by clicking the "clear all" button at the bottom of the dropdown menu (not shown).

According to a second example notification type, a subtle notification may provide a number and a flashing indicator next to the icon, which will also flash to get your attention for a predefined period of time (i.e., 30 seconds, 2 minutes, 5 minutes, etc.). After the predefined time period has lapsed, the flashing will stop or until another notification is received, and then the flashing will resume for another predefined time interval. This subtle indicator provides a way to get the user's attention so that they don't miss a notification that has arrived.

According to yet another example notification type, a pop-up or flyout notification may be used to grab the attention of the user in the event of a more important notification. For example, server status messages and intelligence messages may be among elevated levels of importance and must be shared with the user as they are discovered and not when the user decides to check the notification statuses. A user may also specify which items are important based on a particular notification category, a notification timeframe and/or other user specified notification criteria. The notification items which are designated as "important" may automatically open as though the user clicked on them. An important or "flyout" type of message may invoke a corresponding "flyout" window that will display the notification item.

FIG. 2 illustrates an example flyout window 140 which is invoked in the event of an important error message or system change that the user should be aware of its occurrence. In this example, the flyout window 140 includes a comment section 142 "server error", a solution section "system restart" 144 and a corresponding feedback section "yes or no?" 146 where the user may decide to take action and restart the server. Alternatively, an important action, such as "system error" may invoke an automated action option that initiates an action automatically after a predetermined period of time has elapsed (i.e., restart server). The flyout notification may be accompanied by a loud noise, flashing indicators, etc., so a user may be well informed of an important error while performing their own work functions in the service desk interface 130. For example, a flyout message may provide an indication that a new agent has not been installed on the user's machine and a corresponding button to install an agent now.

According to one example method of operation, the user may have configured a mail message notification to notify them when a new message has arrived in their information center inbox. They see the mail notification item at the top of their window with a "0" next to the icon. Now, assuming a message has been sent to the user, which causes that number to change from a "0" to a "1." A silent notification may provide the user with a mere number change from a "0" to a "1." No other notification will be provided in the case of a silent notification. If the use is watching the indicator then he or she will notice the change, otherwise the indication will not be detectable in the example of a silent notification.

According to another example, a subtle indicator may provide the user with a displayed number change from a "0" to a "1", and the item itself will "flash" or "blink" to get the user's attention. Clicking on the item will stop the flashing from continuing because such an action acknowledges that the user has seen the notification. According to yet another example, a flyout indicator provides the user with a pop-up window that automatically opens and displays the details of the message that has just arrived. The user may then observe the sender and the subject of the email, and can dismiss the item by clicking the "X" on the message, or by clicking on the notification item which will cause the flyout display dialog to close but not remove the notification.

In another example, the notification bar may be hidden when no notifications are present. Also, if there are no present notifications, then the item will not be displayed on the top of the user interface. If the user selects this option, the item would not show a "0" next to it, and instead it would be hidden and when the item changes from "0" to "1", the user would then see the item with whichever notification was selected for this particular indicator category (e.g., silent, subtle, flyout).

According to one example, the user's server may crash or become inoperable while they are actively working on a particular application. In this case, a flyout response may indicate that the user cannot change the notification of this message and so the icon is displayed on the top left of the screen while the flyout is opened to command the user's attention. If the problem is resolved on its own, the notification will automatically be removed, but the user can close the flyout window by clicking on the item. The icon will not go away until the problem is resolved.

According to an active operation example, a user may be handling customer tickets in a ticketing portion of a user application interface. In operating in such an environment, the messages may be arriving into the user's inbox, and they would otherwise be unaware of any of those incoming messages. While the user is processing customer complaints or questions via a ticket system, the user can observe messages without navigating away from the present work area of the application interface.

According to another example, when a user first logs into the application, they may be able to observe that their machine does not have a particular agent installed. Once the agent is installed on their machine, then the VSA can scan their network to discover other devices that might need agents or management. The agent allows the device to be managed remotely. For a new Windows user, there is a notification that would teach them how to use the application system. For example, a message may be provided to the user indicating that "You currently are not connected to the Internet, we've found wireless networks, would you like to connect to a wireless network?." These messages would guide a first time user through using the application and how to connect to a wireless network. Once a user is familiar with the application tools and help menus, the notifications may be turned off.

According to another example, the first time a user executes a particular application (i.e., photo application), a message may be returned indicating certain dialog that assists the user with common features unaware to the user of the application. First time users may be provided the opportunity to access those messages or notifications and see what the photo application product does while it is being used. Experienced users may opt-out of the notifications by selecting a checkbox that says "don't show me these messages again."

In the above-noted examples, an administrator may be working on customer 'tickets' diligently trying to resolve customer service issues. The busy administrator may fail to observe important notifications given the lack of a notification bar. However, a ticket worker would generally not be concerned with a bandwidth problem or alarm which would be handled by a different department. One example might arise when an administrator is working one current issue on behalf of a client or customer (i.e., a first ticket) when another ticket arrives in the administrator's inbox or ticket counter and needs to be dealt with immediately (i.e., important matter). In this case, the administrator may be too busy to observe the new ticket, and therefore it may be unanswered until the current ticket is resolved. The notification bar 100 according to example embodiments may provide an on-going display of updated tickets and other notifications so an administrator may keep up-to-date with such old and new problems as they arise. By alerting the administrator with messages/tickets/notifications in the system, the user may be notified when there is something that requires his or her attention.

According to another example embodiment of the present application, an administrator may be operating in some area of the application, when an important message appears into their inbox 114 regarding a high priority item. A filtering function applied to the notification bar may identify the important message as an alert. The filter may parse the message for important words, such as "important", "urgent", "[username: "president"]", and then elevate the message's status from normal to important. As a result of the message's elevated status, the message may be automatically associated with a different notification bar type or icon than what was previously assigned. For example, if a ticket was issued from a computer IP address or name associated with a president of the corporation, the parser/filter function will identify the president by the information associated with his or her computing device and elevate his or her ticket from "ticket" status 122 to an automatic "alert" status 112 or emergency status.

Messages may be assigned a severity indicator or level of importance by the source reporting the problem. If the server is down or another urgent matter is present on the network, a severity of "1" may be assigned to the problem. Thereafter, escalation rules may be set in place from the service desk, which will send notifications to the appropriate computers, devices, etc., associated with the correct departments and people. According to one example, the notification bar 100 permits a user to configure a notification to be enacted whenever a severity "1" ticket is presented in their queue of notifications. The severity "1" ticket may move to the top of the queue instead of just being a number of tickets or messages "10" as illustrated in FIG. 2. In order to notify the user based on their preference (e.g., silent, subtle, flyout), a user preference may be setup to have the specific types or severities of notifications provided to the user according to the user preferences. Certain users may have certain responsibilities, so a flyout notification for server errors, although disruptive, may be a preferred type of notification for a user operating their computing device while being responsible for maintaining a server's operation.

In operation, each of the notification icons and preferences are components that feed into the notification bar 100, which determines if anyone should be notified. A determination is performed by observing the incoming message (e.g., inbox, ticket, alert, etc.) and looking through each of the notification items registered by users and determines if they match. So if user 'A' has a filter setup for tickets that are assigned to him with a severity of critical, and a ticket that matches those criteria are pushed via a push communication protocol to the notification system, then the ticket and the notification item are linked and the user may observe the notification on their GUI. This is determination is performed for each user, and it is possible that multiple individuals are configured to observe the same ticket/notification. In fact, a single ticket may trigger multiple notifications for a particular user if they have configured their notification items to overlap.

Identifying which icon to assign to incoming messages may be based on a number of different criteria and operations. As illustrated in FIGS. 1 and 2, there are various icons 110-124. Each of these icon types may be paired with a particular notification. For example, a ticket will not be transmitted to an inbox notification since a first check in the "matching" operation of "events" to notification items would yield a resulting icon of tickets or more important notification icons (i.e., alerts). An event such as "ticket created" may be sent to the notification system, where all the user notifications of type 'ticket' may be identified. Next, each of the notification items related to tickets may be identified to check their additional filter features to determine if they should be linked to the notification bar of the user. In the example of an inbox message, the message notification items for a particular user may be observed, which may include identifying the message by type and by user. The message may then be linked to the new inbox message, and the user is notified of the new message.

Figure 3:
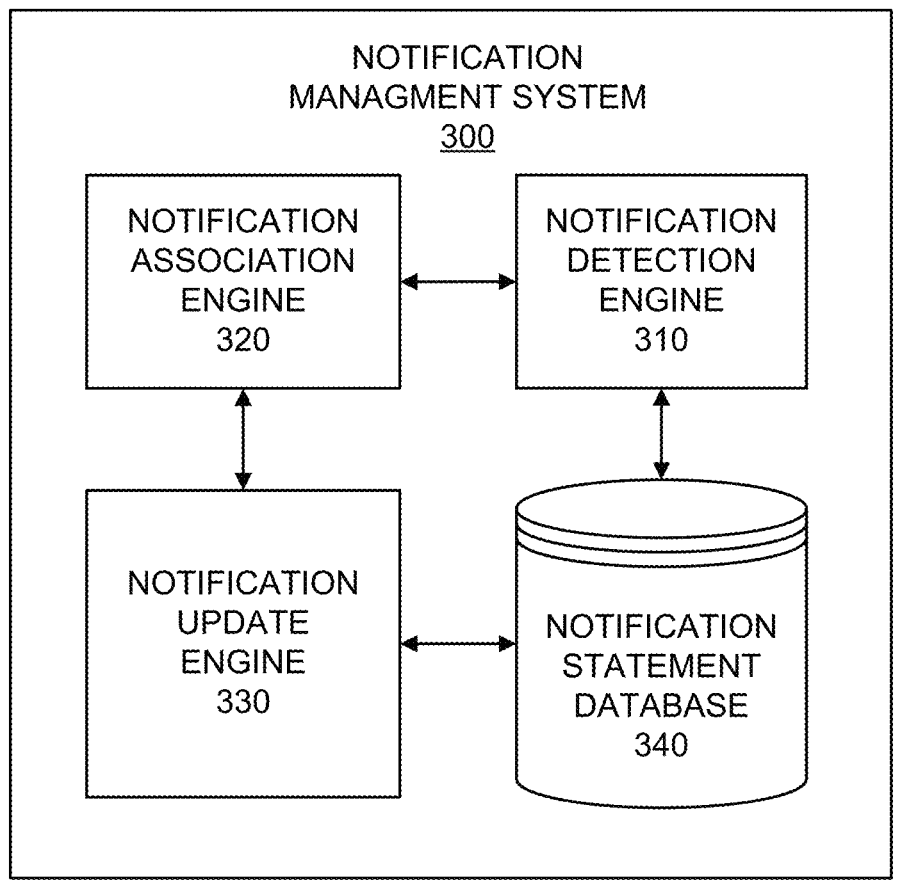
FIG. 3 illustrates an example notification system according to example embodiments.

FIG. 3 illustrates an example notification management system 300, according to example embodiments. Referring to FIG. 3, the notification management system 300 may provide a user application that operates with notification messages. In operation, the system may receive a notification message by the user application that is destined for one or more users operating the user application on their computing devices. The notification may be received and identified by a notification detection engine 310. The received notification may be identified as being part of a predetermined category based on one or more notification statement stored in a statement database 340. The predetermined categories may be linked to one or more portions of a notification bar, which is a portion of the user application. The notification association engine 320 may identify the received notification as being best suited to be displayed as a particular notification message category and may associate the notification message with the identified predetermined category, such as an icon or display emblem. A level of importance of the notification message may be determined based on one or word identification operations used to identify contents of the notification and whether it should be elevated to a higher level of importance or urgency. The notification may also be provided to the user notification bar based on one or more user preferences. A final display operation may utilize one or more notification importance operations and/or user preference operations to display a notification indicator on the notification bar according to the predetermined category and to at least one notification type that corresponds to the level of importance by the notification update engine 330.

According to example embodiments, the predetermined category identified in the notification statement database 340 may correspond to a category name and display icon of the notification bar, such as a type of urgency icon or user preferred icon on the display notification bar. Also, a noise (i.e., sound alert) or dynamic display function (i.e., flashing) may also be incorporated into the notification bar display function depending on the user preferences. The category name and display icon may be subjectively related to content of the notification message. The notification type may include one or more of a silent notification, a subtle notification and a flyout notification. The silent notification does not produce any sounds and the subtle notification does produce at least one sound. The flyout notification may be displayed via a new window based on the notification indicator, the new window may maintain an alert message for a predetermined period of time.

In order to determine an importance of the notification message, the words or strings in the notification message may be parsed to identify at least one word from the notification message that is used to select a predetermined category of the notification bar (e.g., important, unimportant, urgent, etc.) and a notification type used to display the notification message on the user application. The contents of the message are parsed to match an association of word meanings to importance and category types so that the notification bar can display the notification in the correct category and with the correct level of importance.

Example embodiments are preferably realized in a hardware device, such as, a server, computer, cellular phone, or other mobile terminal device etc. In other embodiments, the present application may be realized in hardware, software, firmware or a combination of hardware, software and/or firmware. The above example embodiments may also be implemented in software code and may be stored on a computer readable medium, such as, for example, non-volatile memory devices (e.g., RAM, ROM, hard disk etc.). The software code may be accessed from a non-transitory computer readable medium and may be executed by a processor. The executed program may provide one or more of the features of the example embodiments. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 4 illustrates an example network element 400, which may represent any of the above-described network components of the other figures.

Figure 4:
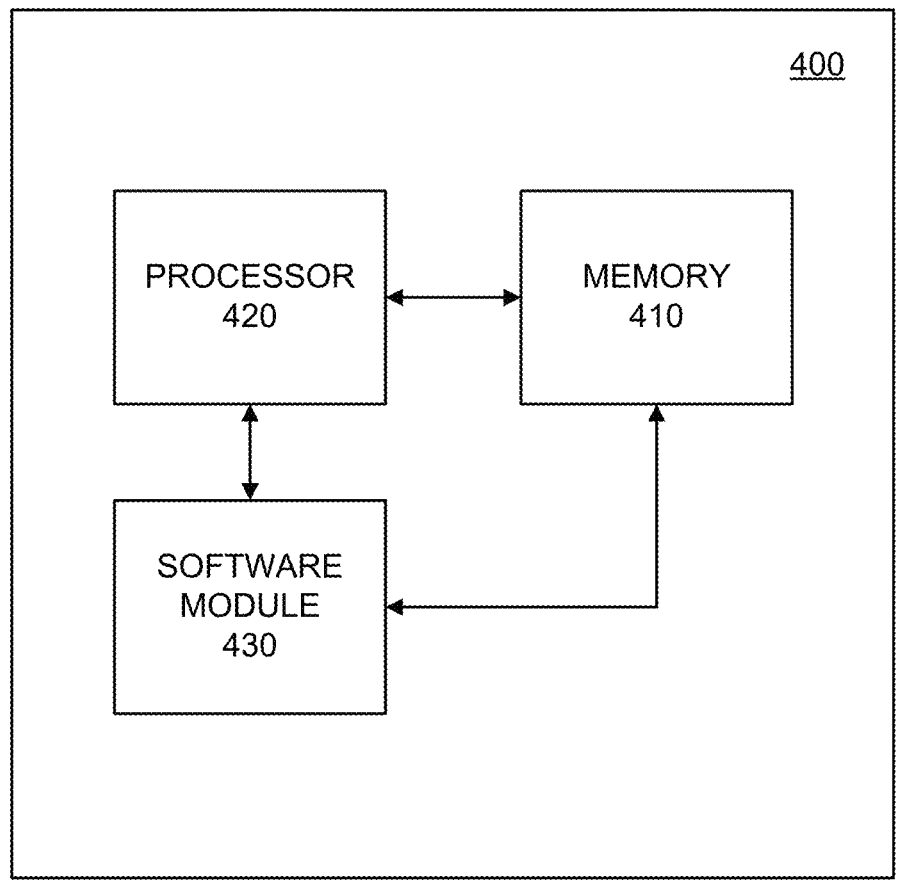
FIG. 4 illustrates an example network entity configured to store instructions and processing hardware for performing operations according to example embodiments of the present application.

As illustrated in FIG. 4, a memory 410 and a processor 420 may be discrete components of the network entity 400 that are used to execute an application or set of operations. The application may be coded in software in a computer language understood by the processor 420, and stored in a computer readable medium, such as, the memory 410. The computer readable medium may be a non-transitory computer readable medium that includes tangible hardware components in addition to software stored in memory. Furthermore, a software module 430 may be another discrete entity that is part of the network entity 400, and which contains software instructions that may be executed by the processor 420. In addition to the above noted components of the network entity 400, the network entity 400 may also have a transmitter and receiver pair configured to receive and transmit communication signals (not shown).

Figure 5:
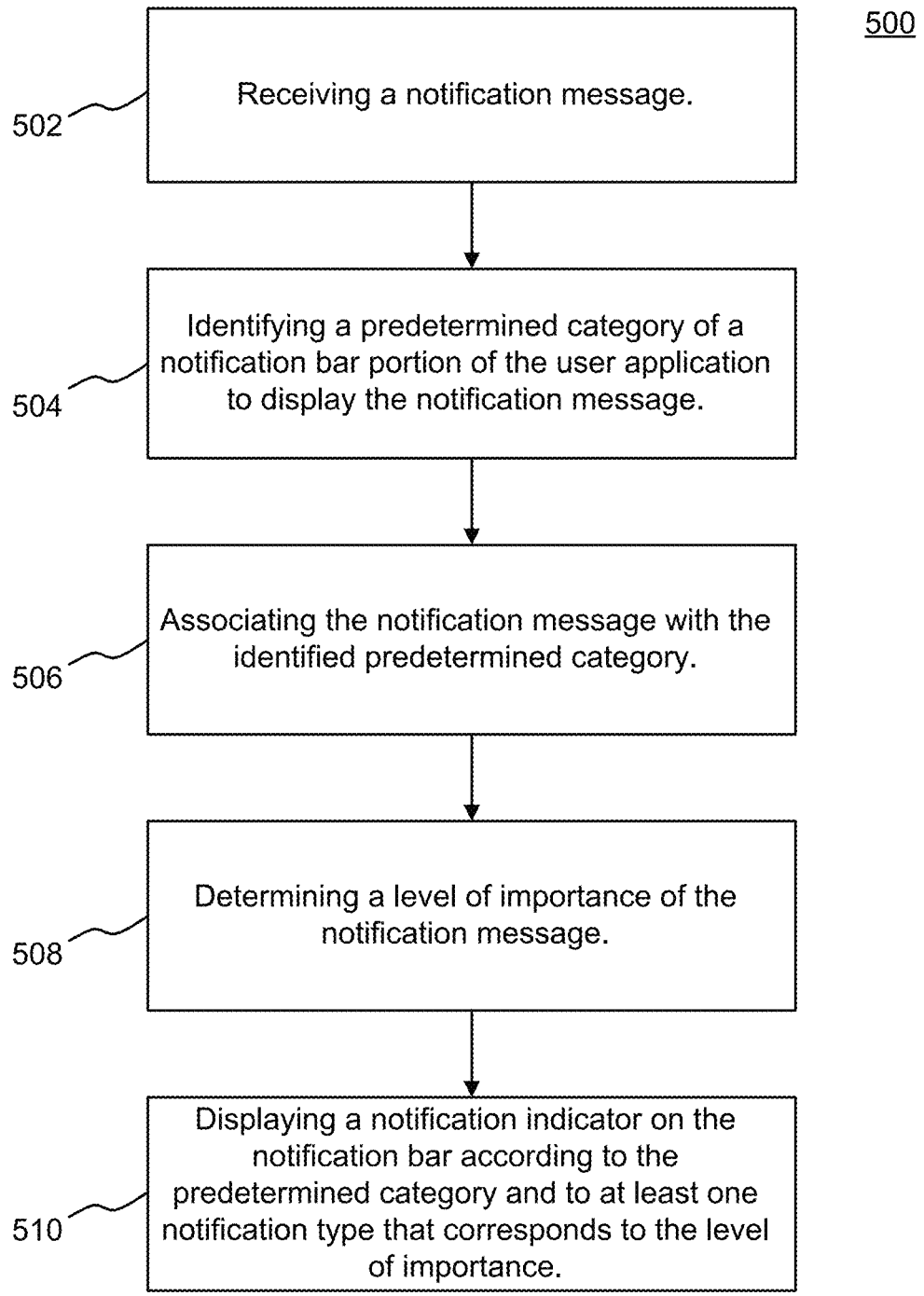
FIG. 5 illustrates an example flow diagram method of operation according to example embodiments of the present application.

FIG. 5 illustrates an example flow diagram of a method of operation according to example embodiments. Referring to FIG. 5, the method may include providing a user application with a notification message by receiving a notification message, at operation 502. The method also includes identifying a predetermined category of a notification bar portion of the user application to display the notification message, at operation 504, and associating the notification message with the identified predetermined category, at operation 506. The method also includes determining a level of importance of the notification message, at operation 508 and displaying a notification indicator on the notification bar according to the predetermined category and to at least one notification type that corresponds to the level of importance, at operation 510.

Figure 6:
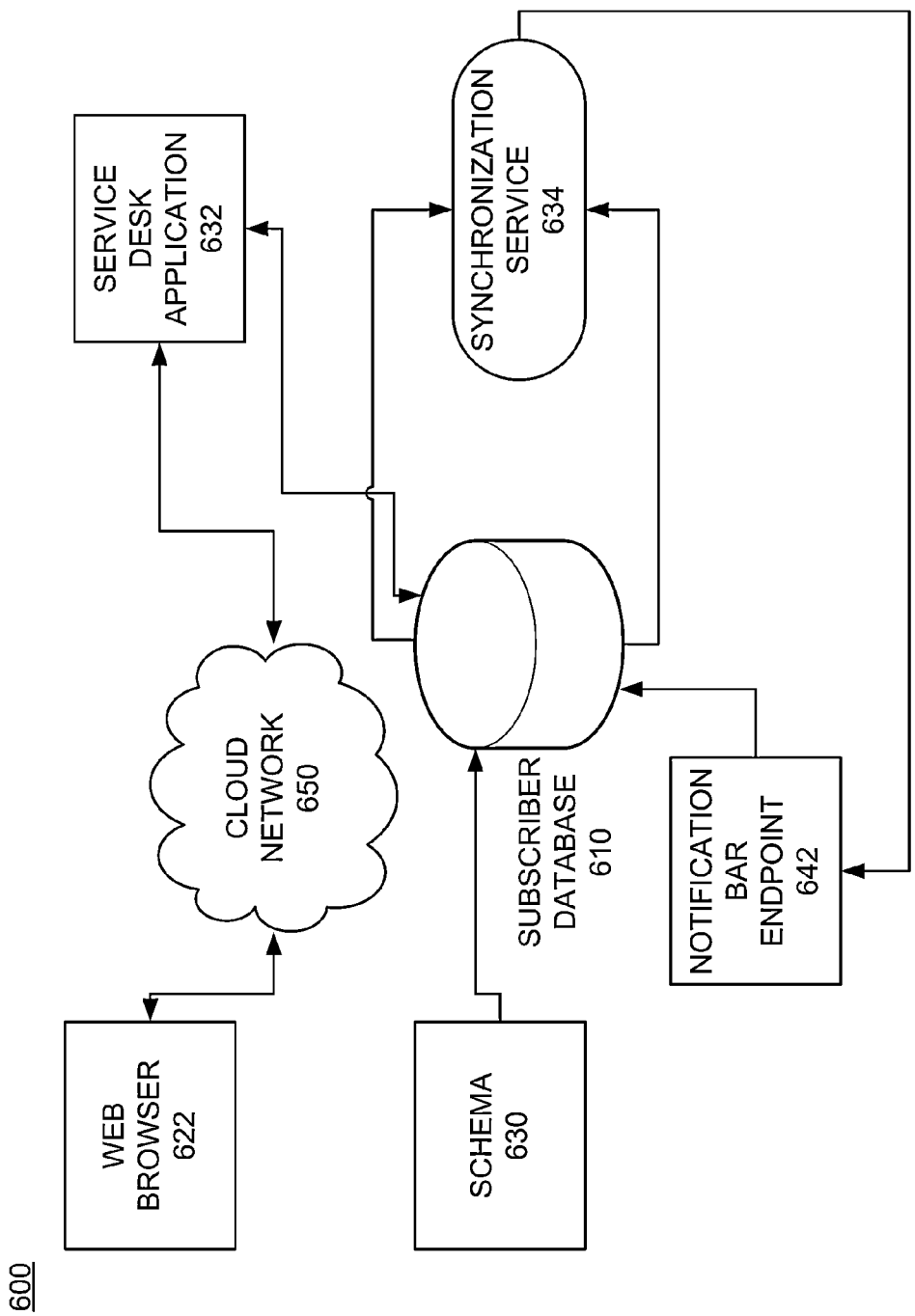
FIG. 6 illustrates an example notification bar updating configuration according to example embodiments.

FIG. 6 illustrates an example notification bar updating configuration according to example embodiments. Referring to FIG. 6, the network configuration 600 provides a notification processing system that identifies and processes notifications that are displayed and/or presented to a notification bar application.

According to one example embodiment, service desk ticket notifications will be discussed with respect to the configuration in FIG. 6. However, any type of notification may be incorporated into the notification processing configuration of FIG. 6. In order to generate a new ticket notification, a basic software installation must be performed by executing a script (i.e., SQL script) that creates a plurality of broker queues and services (i.e., MICROSOFT SQL service broker queues and services).

Among the various services, a synchronization service is registered as a listener to the SQL service broker queue messages arriving and populating the queue. The schema 630 may be applied to the subscriber database 610 to link messages received with the subscriber information for subsequent subscriber delivery and confirmation of notification services. The cache database schema 630 may be uploaded and installed responsive to a SQL script that triggers the scheme update process. The schema 630 provides storage and corresponding summary information about key tables stored in the database 610. A service desk application 632 may provide the table updating information based on information retrieved from the cloud network 650.

The web browser 622 may be a user interface or portal that is used to access a virtual systems administrator (VSA) application that is stored in the cloud 650 along with various service applications, records, and other notification services described throughout this application. Once the schema 630 is applied to the database 610, a SQL script may be used to update one or more database tables which store configuration information including which plug-ins the synchronization service will use for broadcasting messages. The synchronization service 634 will read the configuration for registered end point listeners from the database records 610 and determine the devices that are subscribed to receive notifications.

In operation, when a notification is ready to be sent to an end user a SQL trigger may be sent to the synchronization service 634, which responds by calling an end point with a message (i.e., XML message) payload that includes the notification update and corresponding source and destination information. The endpoint 634 may be any one or more workstations, clients, servers or registered listeners subscribed to receive notification updates of user requests, emergencies, work orders, etc. The end point machines 642 may also update the database 610 by transmitting confirmation updates to the schema depending on changes that may occur or updates that may be considered important for the database schema application. A SQL script may be used to create the database stored procedure used to update the cache database 610 when the plug-in is invoked by the synchronization service 634. Another SQL script may be used to create the database trigger(s) for key tables in the database.

According to example embodiments, the database schema is applied by utilizing one or more database scripts (i.e., SQL scripts), and initiating the creation and/or modification of database objects. Examples of one or more of the tables that may be established by the database schema may include kcache.messageTypeConfiguration, which is a table configuration of each message type. It includes entries, such as 'Window Height', 'Window Width', 'Subject', 'Message', 'Icon', 'System Notification or Management Opportunity', etc. This table may be used to categorize a particular notification bar window user interface and various notification indicia. Another example table may include kcache.notifyUserInstance, which provides an individually configured notification bar per administrator. Examples may include customized user settings that are established and saved. Yet another table may include kcache.notifyUserInstanceFilters, which is a table that accommodates each notification bar item, and which includes the configured filters. Another table may be the kcache.UserNotificationConfiguration, which is used to turn off individual system notifications by the administrator and store those changes. Another table is the kcache.intelligenceMessages, which includes the individual intelligence messages, which can be setup by the administrator or sent to all administrators. Other example tables may include the table kcache.messageUserSnoozeActions, which is used to store 'snoozed' intelligence messages and system notifications by the administrator, and another example table is the kcache.serverStatus, which is used to store current and past server status (e.g., running, stopped, restarting, etc.). Another table may be the kcache.message, which stores inbox message summaries and which has a summary record for each inbox message. The table kcache.alertMessage includes a generic system alert message(s), and the table kcache.ticket includes a ticketing or service desk ticket summary and has a summary record for each ticket. The table kcache.deviceSummary stores the device (agent) summary, such as tickets and alarm counts for a given device.

Updating of the schema may be performed by the end user after the notification messages are received. For example, the message may be dismissed and deleted from the database. Messages may also be snoozed and inserted as a record into the table kcache.messageusersnoozeaction. When an action button(s) is selected for a given message, this will open a dialog for specific processing, which will in turn remove the message. The registered listeners are called by the synchronization service when a message is submitted. Not all listeners are listening for the same message, as it depends on how they are registered. An example of a ticketing listener registration is provided below: Broker Queue Name: SDIncidentSyncQueue; Send XML Message To; Conduit (MSMQ): NotificationSync; Assembly Name: NotificationBar.Sync; Class Name: SDIncidentSyncQueue-Worker.

It is important to note that the above-noted URL is for example purposes only and is not provided as an information source relevant to the content of the present application.

Figure 7:
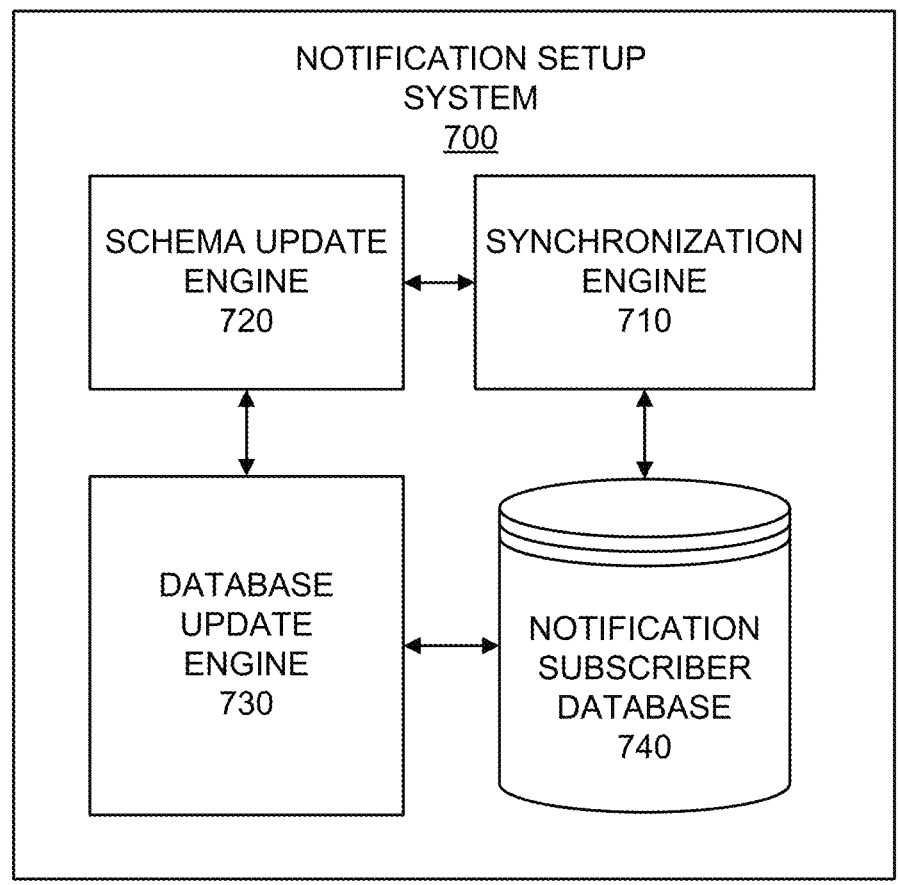
FIG. 7 illustrates an example notification setup system according to example embodiments.

FIG. 7 illustrates an example notification setup system according to example embodiments. Referring to FIG. 7, the system 700 includes various modules which may be part of the same device or may include multiple devices operating as a single system. In operation, the system 700 may configure the notification procedure by updating one or more database tables to reflect incoming customer tickets, emergency generated tickets or other notifications that were created for an administrative purpose. The information may be stored in the database 740, which also stores the subscriber information of the potential listeners of the notifications. A trigger may be transmitted from the database 740 to the synchronization engine 710 indicating that a notification should be forwarded to one or more end users (i.e., listeners).

When a trigger message is transmitted, a message is created and placed on a service broker queue setup by the schema update engine 720. As a result, the synchronization service engine 710 may monitor the queue(s) provided by the configuration table and retrieve a message from the queue(s) as it becomes available. The messages may be identified by an audit criteria setup as a parsing operation configured to identify a particular word, title, heading, etc., of a particular event (e.g., emergency, error type, user problem, etc.), and when that word, phrase or identifier is located in one or more message queues, the message may be copied and forwarded to the appropriate subscribers/listeners depending on the subscriber criteria stored in the database 740. The synchronization engine 710 may determine which listeners need to receive the message based on the listener data stored in the database 740. Accordingly, a message(s) is sent to a plug-in service installed by the synchronization engine 710 which receives the message with an XML payload of the summary data. The plug-in service may call the stored procedure which will update the cache database schema via the scheme update engine 720. In this case, the 'tickets' summary database table may be updated to reflect the new tickets received. The changes to the database content may be performed by a database update engine 730. A notification bar on an end user's graphical user interface (GUI) will then be refreshed (e.g., every 30, 60, 90 seconds) to receive the new ticket summary information.

Figure 8:
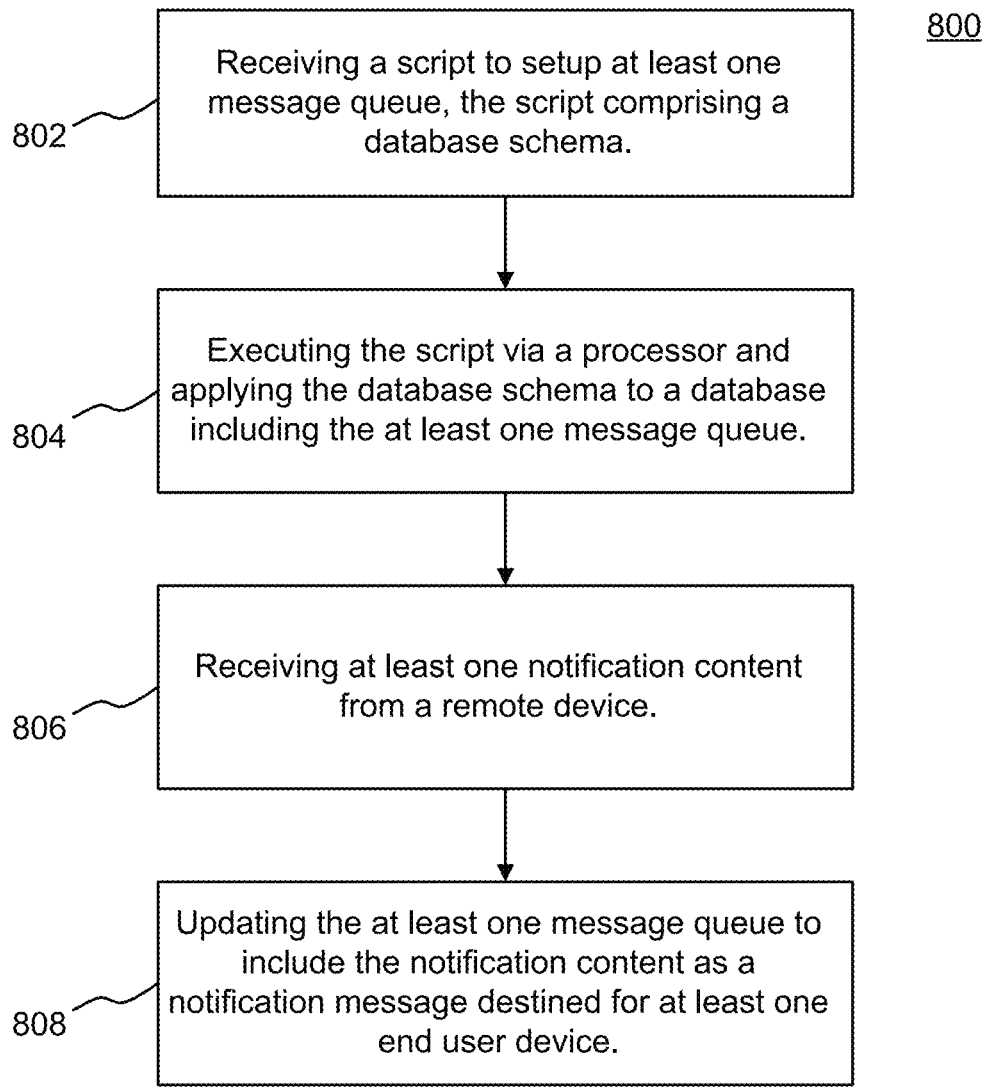
FIG. 8 illustrates an example flow diagram method of operation according to example embodiments of the present application.

FIG. 8 illustrates an example flow diagram method of operation according to example embodiments of the present application. Referring to FIG. 8, the method may include receiving a script to setup at least one message queue, the script comprising a database schema at operation 802 and executing the script via a processor and applying the database schema to a database including the at least one message queue at operation 804. The method may also include receiving at least one notification content from a remote device at operation 806, and updating the at least one message queue to include the notification content as a notification message destined for at least one end user device, at operation 808.

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the systems described herein can be performed by one or more of the modules or components described herein or in a distributed architecture. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

It is to be understood that the above description is intended to be illustrative, and not restrictive. Many other embodiments will be apparent to those of skill in the art upon reading and understanding the above description. Although the present application has been described with reference to specific exemplary embodiments, it will be recognized that the application is not limited to the embodiments described, but can be practiced with modification and alteration within the spirit and scope of the appended claims. Accordingly, the specification and drawings are to be regarded in an illustrative sense rather than a restrictive sense. The scope of the application should, therefore, be determined with reference to the appended claims, along with the full scope of equivalents to which such claims are entitled.

What is claimed is:

1. A method comprising: receiving a script to setup at least one message queue, the script comprising a database schema:
   executing the script via a processor and applying the database schema to a database including the at least one message queue;
   receiving at least one notification content from a remote device;
   updating the at least one message queue to include the notification content as a notification message destined for at least one end user device;
   identifying the notification content as including content specified by registered listeners by filtering the notification content based on a filter established for each of the registered listeners;
   determining the filter has a predetermined level of severity which matches a level of severity identified from at least one parsed term from the notification content;
   elevating a status of the notification message and responsive to the elevated status, automatically associating the notification message with a newly assigned notification bar type;
   calling the registered listeners when the notification message is received and the predetermined level of severity has been satisfied based on the filtering of the notification content;

matching the notification content to the content specified by the registered listeners intended to receive the notification message; and forwarding the notification message to a user interface of the registered listeners.

2. The method of claim 1, further comprising:

triggering a notification message script responsive to receiving the at least one notification content; and transmitting the notification message script to a synchronization service application.

3. The method of claim 2, further comprising:

transmitting the notification message to the at least one end user device to be displayed on a notification bar user interface application.

4. The method of claim 1, further comprising:

updating at least one table created by the database schema in the database responsive to receiving the at least one notification.

5. The method of claim 1, further comprising:

identifying at least one registered listener profile stored in the database, the at least one registered listener configured to receive the at least one notification message.

6. The method of claim 1, further comprising:

receiving an update message from the at least one end user device; and updating the database schema based on the at least one update message received.

7. The method of claim 1, wherein the at leas one notification message is an extensible markup language (XML) message.

8. An apparatus comprising:

a receiver configured to receive a script to setup at least one message queue, the script comprising a database schema; and a processor configured to execute the script and apply the database schema to a database including the at least one message queue;

wherein the receiver is also configured to receive at least one notification content from a remote device, and the processor is configured to update the at least one message queue to include the notification content as a notification message destined for at least one end user device, identify the notification content as including content specified by registered listeners and filter the notification content based on a filter established for each of the registered listeners, determine the filter has a predetermined level of severity which matches a level of severity identified from at least one parsed term from the notification content, elevate a status of the notification message and responsive to the elevated status, automatically associate the notification message with a newly assigned notification bar type, call the registered listeners when the notification message is received and the predetermined level of security has been satisfied based on the filtered notification content, match the notification content to the content specified by the registered listeners intended to receive the notification message; and forward the notification message to a user interface of the registered listeners.

9. The apparatus of claim 8, wherein the processor is further configured to trigger a notification message script responsive to receiving the at least one notification content, and wherein a transmitter is further configured to transmit the notification message script to a synchronization service application.

10. The apparatus of claim 9, wherein the transmitter is configured to transmit the notification message to the at least one end user device to be displayed on a notification bar user interface application.

11. The apparatus of claim 8, wherein the processor is further configured to update at least one table created by the database schema in the database responsive to receiving the at least one notification.

12. The apparatus of claim 8, wherein the processor is further configured to identify at least one registered listener profile stored in the database, the at least one registered listener configured to receive the at least one notification message.

13. The apparatus of claim 8, wherein the receiver is further configured to receive an update message from the at least one end user device; and the processor is further configured to update the database schema based on the at least one update message received.

14. The apparatus of claim 8, wherein the at least one notification message is an extensible markup language (XML) message.

15. A non-transitory computer readable storage medium configured to store instructions that when executed cause a processor to perform:

receiving a script to setup at least one message queue, the script comprising a database schema;

executing the script via a processor and applying the database schema to a database including the at least one message queue;

receiving at least one notification content from a remote device;

updating the at least one message queue to include the notification content as a notification message destined for at least one end user device;

identifying the notification content as including content specified by registered listeners by filtering the notification content based on a filter established for each of the registered listeners;

determining the filter has a predetermined level of severity which matches a level of severity identified from at least one parsed term from the notification content;

elevating a status of the notification message and responsive to the elevated status, automatically associating the notification message with a newly assigned notification bar type;

calling the registered listeners when the notification message is received and the predetermined level of severity has been satisfied based on the filtering of the notification content;

matching the notification content to the contend specified by the registered listeners intended to receive the notification message; and forwarding the notification message to a user interface of the registered listeners.

16. The non-transitory computer readable storage medium of claim 15, wherein the processor is further configured to perform:

triggering a notification message script responsive to receiving the at least one notification content; and transmitting the notification message script to a synchronization service application.

17. The non-transitory computer readable storage medium of claim 16, wherein the processor is further configured to perform:
  transmitting the notification message to the at least one end user device to be displayed on a notification bar user interface application.

18. The non-transitory computer readable storage medium of claim 15, wherein the processor is further configured to perform:
  updating at least one table created by the database schema in the database responsive to receiving the at least one notification.

19. The non-transitory computer readable storage medium of claim 15, wherein the processor is further configured to perform:
  identifying at least one registered listener profile stored in the database, the at least one registered listener configured to receive the at least one notification message.

20. The non-transitory computer readable storage medium of claim 15, wherein the processor is further configured to perform:
  receiving an update message from the at least one end user device; and
  updating the database schema based on the at least one update message received, and wherein the at least one notification message is an extensible markup language (XML) message.

* * * * *